2,845,430

CERTAIN 1-AMINO, 2-PYRIDONES AND PROCESS

Hans Erlenmeyer, Basel, Switzerland, assignor to Ciba Pharmaceutical Products Inc., Summit, N. J.

No Drawing. Application June 20, 1957
Serial No. 667,030

Claims priority, application Switzerland July 10, 1956

14 Claims. (Cl. 260—296)

This invention relates to a new process for the manufacture of 1-amino-pyridone-(2) compounds and salts thereof, and to certain new 1-amino-pyridone-(2) compounds having hypotensive activity.

The pyridine ring in the compounds obtained by the new process of the invention may be further substituted, preferably by alkyl radicals, e. g. methyl.

In the process of this invention an N-unsubstituted pyridone-(2) compound, preferably in the form of a metal salt thereof, for example, an alkali metal salt, is reacted with N-halogen-amine such as N-chloramine. Thus, for example, pyridone-(2) or a C-lower-alkyl-pyridone-(2) may be reacted with chloramine to form the corresponding 1-amino-pyridone-(2).

The reaction is advantageously carried out in a concentrated aqueous solution and in the cold. Depending on the procedure used the 1-amino-pyridones are obtained in the form of their bases or salts. From the bases salts may be formed, such as those of hydrohalic acids, sulfuric acid, nitric acid, phosphoric acid, acetic acid, propionic acid, oxalic acid, malic acid, citric acid, methane sulfonic acid, ethane sulfonic acid, oxyethane sulfonic acid, benzoic acid, salicylic acid, para-amino-salicylic acid or para-toluene sulfonic acid. From the salts obtained by the process the free bases can be made by methods in themselves known.

The compounds obtained by the new process are useful for a wide variety of purposes in industry. They are in part known.

Of special importance are 1-amino-pyridone-(2) and C-lower-alkyl-1-amino-pyridones-(2) and therapeutically useful acid addition salts thereof. These compounds are new and form a preferred object of the invention. They possess interesting pharmacological properties. They have a hypotensive action and can therefore be used therapeutically as agents lowering the blood pressure. Of particular importance in this regard are the 1-amino-4-methyl-pyridone-(2) of the formula

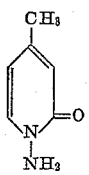

and its salts.

1-amino-pyridone-(2) and its C-lower alkyl derivatives and their salts can be used as medicaments, e. g. in the form of pharmaceutical preparations which contain them in admixture with a therapeutically useful pharmaceutical organic or inorganic solid or liquid carrier material suitable for enteral or parenteral application. For the production of these prepartions such substances are concerned as do not react with the new compounds, as for example water, gelatine, lactose, starch, magnesium stearate, talc, vegetable oils, benzyl alcohols, gums, polyalkylene glycols, or other known medicament carriers. The pharmaceutical preparations can take the form of, for example, tablets or dragees, capsules or pearls, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are formulated by the usual methods.

The following examples illustrate the invention:

Example 1

The sodium salt of pyridone-(2) prepared from 12 grams of pyridone-(2) is introduced into an ice-cooled chloramine solution, which has been prepared by adding 203 cc. of a 1.84 molar solution of ammonia to 65 cc. of a 1.93 molar neutral solution of sodium hypochlorite at 0° C. and then allowing the reaction mixture to stand for one hour in a mixture of ice and sodium chloride. The strongly alkaline reaction solution is stirred overnight in a cooling mixture, and is then extracted with ether for 24 hours in a Kutscher-Steudel apparatus. The extract is dried with potassium carbonate, and on cooling to −10° C. forms crystals melting at 62–63° C. The 1-amino-pyridone-(2) so obtained may be recrystallized from a mixture of benzene and petroleum ether. It forms small colorless prismatic rods melting at 64–66° C.

The free base can be converted into its hydrochloride by saturating an ethereal solution of the base with gaseous hydrogen chloride. 1-amino-pyridone-(2) hydrochloride crystallizes from a mixture of ether and ethanol or from isopropanol in the form of colorless needles melting at 175–177° C.

Example 2

130 cc. of 1.95-molar neutral sodium hypochlorite solution (0.25 mol) are mixed at 0° C. with 406 cc. of 1.86-molar ammonia (0.75 mol), and the mixture allowed to stand in an ice-sodium chloride cooling mixture for 1 hour. There is then added to this solution the sodium salt prepared from 24 grams of 4-methyl-pyridone-(2) (0.25 mol) with 200 cc. of 50% caustic soda solution. The mixture is stirred overnight in an ice-sodium chloride sooling mixture and then extracted with ether for 20 hours in a Kutscher-Steudel apparatus. The extract is dried with sodium sulfate and evaporated to obtain a crystallizate. The resulting 1-amino-4-methyl-pyridone-(2) melts after recrystallization from a mixture of benzene and petroleum ether at 74–76° C.

Example 3

Into the ice-cooled chloramine solution described in Example 1 there is introduced the sodium salt prepared from 8.8 grams of 3-methyl-pyridone-(2). The reaction solution is stirred for 12 hours at a pH value greater than 10 in a cooling mixture of ice and sodium chloride. The whole is then extracted with ether for 24 hours in a Kutscher-Steudel apparatus. The ethereal extract is dried over potassium carbonate, filtered, and mixed with the extract obtained by extracting the potassium carbonate at the boil three times with 60 cc. of ether on each occasion. Upon cooling the ethereal solution 1-amino-3-methyl-pyridone-(2) of the formula

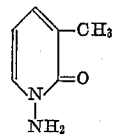

crystallizes out. It melts at 95–96° C. after recrystallization from benzene.

Starting from 5- or 6-methyl-pyridone-(2) there is obtained in the same way 1-amino-5-methyl-pyridone-(2) of melting point 100–101.5° C. or 1-amino-6-methyl-pyridone-(2) of melting point 70–71.5° C., respectively.

What is claimed is:

1. Process for the manufacture of 1-amino-pyridone-(2) compounds which comprises treating a member selected from the group consisting of an N-unsubstituted pyridone-(2) compound, the only reactive hydrogen atom of which is that attached to the nitrogen atom, and a metallic salt thereof, with halogenamine.

2. Process for the manufacture of 1-amino-pyridone-(2) compounds which comprises treating a member selected from the group consisting of an N-unsubstituted pyridone-(2) compound, the only reactive hydrogen atom of which is that attached to the nitrogen atom, and a metallic salt thereof, with an aqueous solution of halogenamine.

3. Process for the manufacture of 1-amino-pyridone-(2) compounds which comprises treating pyridone-(2) with an aqueous solution of chloramine.

4. Process for the manufacture of 1-amino-pyridone-(2) compounds which comprises treating C-lower alkyl-pyridones-(2) with an aqueous solution of chloramine.

5. Process for the manufacture of 1-amino-pyridone-(2) compounds which comprises treating 4-methyl-pyridone-(2) with an aqueous solution of chloramine.

6. Process for the manufacture of 1-amino-pyridone-(2) compounds which comprises treating the sodium salt of 4-methyl-pyridone-(2) with an aqueous solution of chloramine.

7. A member selected from the group consisting of 1-amino-pyridone-(2), the C-lower alkyl-1-amino-pyridones-(2) and salts thereof.

8. 1-amino-pyridone-(2).
9. 1-amino-3-methyl-pyridone-(2).
10. 1-amino-4-methyl-pyridone-(2).
11. 1-amino-5-methyl-pyridone-(2).
12. 1-amino-6-methyl-pyridone-(2).

13. Process for the manufacture of 1-amino-pyridone-(2) compounds which comprises treating a metallic salt of pyridone-(2) with an aqueous solution of chloramine.

14. Process for the manufacture of 1-amino-pyridone-(2) compounds which comprises treating a metallic salt of C-lower alkyl-pyridone-(2) with an aqueous solution of chloramine.

References Cited in the file of this patent

Audrieth et al.: Chem. Abst., vol. 49, pages 12273–4 (1955).